United States Patent
Buck et al.

[11] Patent Number: 5,779,560
[45] Date of Patent: Jul. 14, 1998

[54] GOLF CLUB HEADS

[75] Inventors: Michael Eugene Buck, Hudson, N.H.; Stephen Anthony Kraus, West Groton; Thomas William Shahood, Dunstable, both of Mass.

[73] Assignee: Textron Systems Corporation, Wilmington, Mass.

[21] Appl. No.: 420,966

[22] Filed: Apr. 13, 1995

[51] Int. Cl.$^6$ .................................... A63B 53/04
[52] U.S. Cl. ............................ 473/342; 423/329
[58] Field of Search .............................. 473/342, 347, 473/348, 349, 329, 332; 273/173, 174, 169

[56] References Cited

U.S. PATENT DOCUMENTS

| | | |
|---|---|---|
| 4,792,139 | 12/1988 | Nagasaki et al. ............ 273/167 H |
| 5,016,883 | 5/1991 | Kobayashi ..................... 473/347 |
| 5,078,397 | 1/1992 | Aizawa ........................... 273/78 |
| 5,154,425 | 10/1992 | Niskanen et al. ............ 273/167 J |
| 5,403,007 | 4/1995 | Chen ............................... 473/342 |
| 5,518,242 | 5/1996 | Mahaffey et al. .............. 473/342 |

FOREIGN PATENT DOCUMENTS

| | | | |
|---|---|---|---|
| 0540214A1 | 5/1993 | European Pat. Off. | .......... C22C 1/09 |
| 2259863 | 3/1993 | United Kingdom | .......... A63B 53/04 |
| 2264439 | 9/1993 | United Kingdom | .......... A63B 53/04 |

Primary Examiner—Vincent Millin
Assistant Examiner—Charles W. Anderson
Attorney, Agent, or Firm—Scott A. McNeil; Mary E. Porter

[57] ABSTRACT

The striking surface of a golf club is constructed of a fiber reinforced composite insert. The insert is formed of a metal striking surface having at least one layer of backing comprising a ply of fibers in a metal matrix laminated to the back of the striking surface. The insert is secured to the face of the golf club for engagement with the ball.

12 Claims, 2 Drawing Sheets

GOLF CLUB HEADS

BACKGROUND OF THE INVENTION

Golf clubs were historically categorized as either woods or irons depending on the composition of the materials used to form the heads. Although the categories of woods and irons have continued, the materials have changed drastically. An active field of players have driven the technology of fabricating golf club heads a far way from the original designs.

Along the way, metal was used to construct woods and the terminology "metal woods" came into usage. Both woods and irons were improved by a long shot as they began to be constructed from composite materials, as opposed to monolithic metals. In one form or another, these changes were designed to extend the life of the ball striking surface of the golf club head, to give an adjustable center of gravity, to selectively weight the perimeter of the golf club head so that the largest possible "sweet spot" could be achieved, to provide the desirable sonic characteristic when the golf club hits the ball, to provide an increase in the inertial moment of the golf club head during the swing, and/or to provide a feel of a solid impact and control when the club is swung and strikes the ball. Ideally, these goals are achieved without changing the basic look of the golf club head so that the player recognizes the club as either a wood or an iron.

Among the improvement suggested for golf club heads are the use of a fiber reinforced plastic insert positioned in a location remote from the club head strike face, as described in U.S. Pat. No. 4,928,972, issued May 29, 1990, to Nakanishi, et al. This fiber reinforced synthetic resin insert is disposed on the side of the golf club head remote from the shooting surface and is disclosed to provide an increase in the inertial moment of the club head. It is also intended to provide a center of gravity which can more easily adjusted. Adjustment of the center of gravity is necessary during fabrication of golf clubs with different degrees of loft.

Various powder metallurgy processes utilizing variable density materials in different portions of the club head to improve the sonic characteristics of the club and to extend the life of the ball striking surface, are disclosed in U.S. Pat. No. 4,992,236, issued Feb. 12, 1991, to Shira. In each case, the process involves the use of a mold in the shape of a golf club, which mold is filled with metal powders. As an option, the mold may be designed to contain inserts of materials such as metal casting, wrought metal and green compacts of metal powders.

Forged metal inserts have been suggested for the face plate (ball striking surface) to provide more solid impact and better control and feel to the club. U.S. Pat. No. 5,024,437, issued Jun. 18, 1991, to Anderson -discloses forged metal inserts of materials such as stainless steel, beryllium, copper, titanium or aluminum As noted in the disclosure, forged metal is not amenable to casting and is not desirable for use in forming the entire head. However, inserts of a forged metal plate at the strike surface are disclosed to be desirable due to the inherently greater strength of the forged metal relative to a cast metal face plate, and its uniform hardness over the hitting area of the strike face.

An improvement to the basic forged metal inserts is disclosed in U.S. Pat. No. 5,261,663, issued Nov. 16, 1993, to Anderson. This improvement gives added heel and toe region weighting to the golf club, as well as providing known benefits. The weighting of the forged metal face plate is achieved by increasing the thickness of the plate around the periphery.

In yet a farther improvement to the basic forged metal insert, U.S. Pat. No. 5,261,664, issued Nov. 16, 1993, to Anderson discloses the casting of a main body member of the golf club head such that the main body member has a front opening with ledges facing forward toward the front opening. These ledges are then available for connecting the forged metal strike face to the front of the main body member of the golf club. Likewise, the strike face insert has ledges adapted to permit mounting by brazing or welding or otherwise fastening the strike face insert to the ledges of the main body member.

In yet another improvement to the basic forged metal strike face insert, U.S. Pat. No. 5,255,918, issued Oct. 26, 1993, to Anderson, et al., discloses a golf club head construction with a completely enclosed recess at the rear of the strike face and a ledge configuration permitting a trapezoidal weld configuration between the strike face and the main body member. Additionally, the strike face may be a forged metal plate consolidated from a metal powder, such as steel powder. The forged metal plate is disclosed to have a thickness of 1/32 to one inch. The use of titanium in the forged metal plate as a strike face insert is disclosed.

SUMMARY OF THE INVENTION

This invention provides a golf club head comprising a main body member; a strike face, comprising a fiber reinforced metal composite having a metallic striking surface; and a means for joining the strike face to the main body member, wherein the golf club head is characterized by resistance to deformation when a golf club head strikes a ball at speeds in excess of 100 miles per hour (i.e., up to 140 miles per hour). In a preferred embodiment, the golf club head contains a strike face insert which is a composite laminate of at least one ply of fiber reinforced metal and at least one ply of metal, laminated such that the fibers within the ply are oriented in a direction relative to the neutral axis of the strike face which provides maximum ball striking surface strength and stiffness.

The preferred materials for this construction are titanium, and/or aluminum alloy composite, fabricated with a high modulus, high strength fiber such as silicon carbide or boron fiber. Such a composite construction provides a strike face characterized by up to a 20 percent increase in stiffness and up to a 30 percent decrease in weight of the strike face, relative to an equivalent strike face comprising an equivalent metal without fiber reinforcement. This provides a lighter strike face which allows additional perimeter weighting, additional control of the center of gravity, a lighter head and an improved feel and/or more desirable sonic characteristics.

DESCRIPTION OF THE PREFERRED EMBODIMENTS

Figure 1:
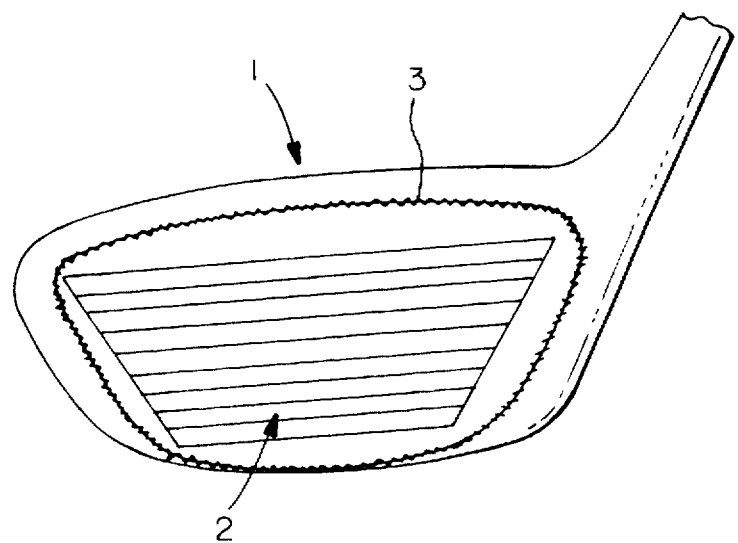
FIG. 1 is a side elevational view of embodiment of the invention representing a metal wood golf club head constructed with a fiber reinforced metal strike face insert.
Figure 2:
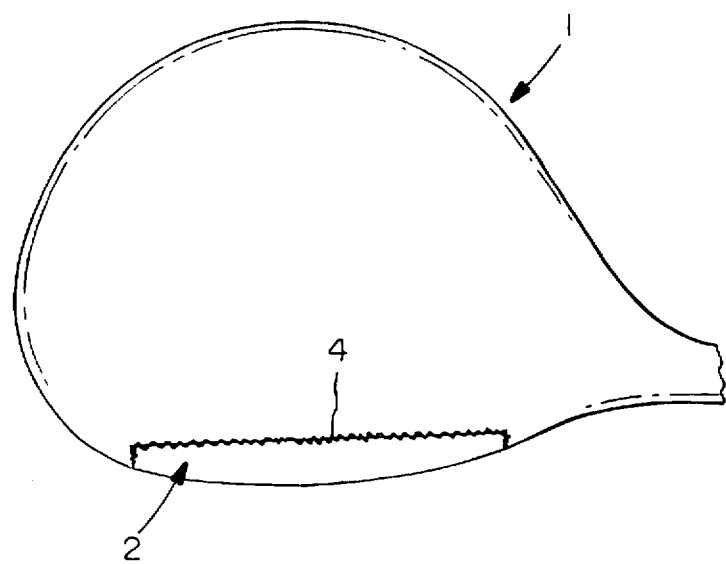
FIG. 2 is a bottom plan view of the metal wood shown in FIG. 1.

Referring to FIGS. 1–2, the embodiment illustrated is a "wood" type driver. The main body member (1), may be formed by casting from a metal such as stainless steel, aluminum, titanium, copper or other ductile materials, preferably metals or metal alloys. The strike face insert (2), as described herein, is fabricated from fiber reinforced metal composite and abutted against the front surface of the main body member casting and joined to the casting, preferably by brazing or welding, along the joints (3). The joints (3) run along the perimeter of the strike face insert and the front opening of the main body member (1), thereby permitting integration of the strike face insert (2) with the main body member (1). The main body member has a recess portion (4) into which the periphery of the strike face insert (2) is fitted and joined. The joint (3) is generally trapezoidal or ellipsoidal in shape with an elongated top and bottom and a curved surface, the top curved surface being upward convex and the bottom curved surface being downward convex.

Figure 3:
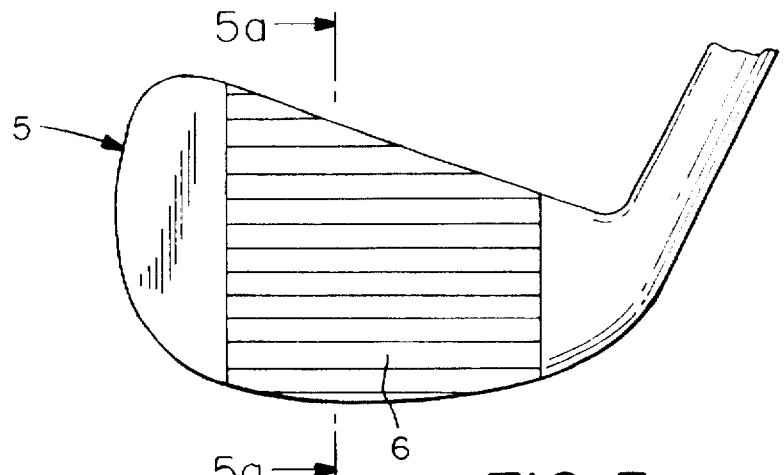
FIG. 3 is an elevation showing an iron golf club head incorporating the fiber reinforced metal strike face insert of the invention.
Figure 4:
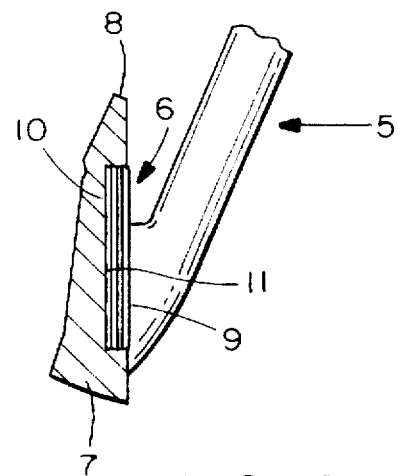
FIG. 4 is a cross section view taken on lines 5a–5b of FIG. 3.

Referring to FIGS. 3–4, a iron embodiment of the golf club head of the invention is illustrated. In FIG. 3, a main body member (5) is made of for example, stainless steel, aluminum, cast iron or brass and has a substantially triangular transverse cross sectional profile so that its ball striking face (6) has a prescribed loft angle. As shown in FIG. 4, the sole face (7) is thicker than the top (8) of the head. The strike face insert (9) comprising a fiber reinforced metal composite is inserted on the ball striking face (6) of the iron. The insert (9) is secured to the ball striking face (6) by brazing, welding, or by some other fastening means such that the entire interior surface (10) of the strike face insert (9) is fastened to the interior surface (11) of the iron.

Figure 5:
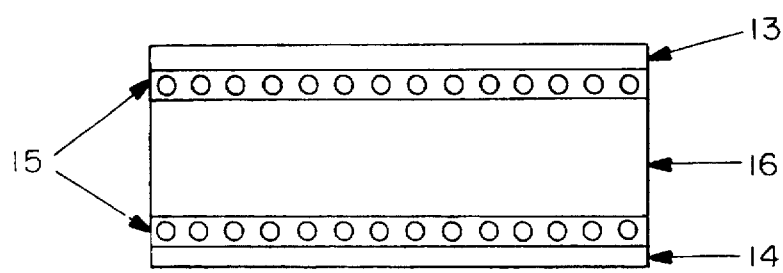
FIG. 5 is a cross section view of a representative composite laminate used to construct the strike face inserts of the invention.

Referring to FIG. 5, FIG. 5 is cross sectional view of a representative composite laminate strike face insert of the invention. The metallic striking surface (13) is approximately 0.005 to 0.04 inches in thickness and is laminated to a fiber reinforced metal layer (15) which is approximately 0.005 to 0.04 inches in thickness. The fiber reinforced metal layer (15) is laminated to a metal layer (16) of approximately 0.005 to 0.40 inches in thickness, and the metal layer (16), is laminated to a second fiber reinforced metal layer (15), which is laminated to a third metal layer (14) which is about 0.005 to 0.04 inches in thickness.

In a preferred embodiment, a silicon carbide fiber reinforced titanium composite laminate serves as the club strike face or hitting surface of metal wood or iron golf clubs. A titanium composite laminate insert provides increased strength and stiffness at lower material densities. The high strength and light weight of the titanium composite laminate insert further allows redistribution of existing club head weight to selective perimeter and sole plate locations, thereby permitting alteration of the club head center of gravity.

The titanium composite laminate insert preferably consists of a combination of monolithic titanium in sheets, foil or powder tape (with a fugitive binder) and a planner arrays of high strength, high modulus monofilaments in a laminated layup. The absence of the fiber along the strike face surface permits the machining of the strike face grooves. Continuous fiber lengths are preferred in these composites. In a preferred embodiment the fiber reinforced layers are as near the strike face surface of the insert as possible, and as far from the center line of the long distance of the insert as possible. The metal wood insert preferably has a compound curvature design element from toe to heel (known as bulge), and from top to bottom (known as roll).

Any of the fiber/matrix preform methods currently used or known for titanium composite laminates are technically feasible for insert applications. For cost considerations, a titanium powder/silicon carbide monofilament preform is preferably produced by creating a parallel array of fibers and then introducing a slurry of titanium or titanium alloy powders and an appropriate fugitive binder system. Once the fiber/matrix preform has been produced, it is consolidated to monolithic titanium material by a thermal and pressure offgas densification cycle. The preferred fabrication method to achieve this consolidation involves stacking several large area laminate layups in a vacuum hot press and applying appropriate heat and pressure to achieve 100% composite density (e.g., 500° to 2,000° C. at 100 to 10,000 psi for 5 minutes to 10 hours).

Individual club face inserts may be abrasive waterjet machined, stamped, or cut from the larger composite panels, and, optionally, have grooves machined or embossed into one face, followed by a brief forming operation (e.g., cold die pressure) to achieve the desired curvature for metal wood applications. Where silicon fibers are used, forging is undesirable due to the fiber interface degradation which can occur at the high temperatures needed in this operation.

Preferred construction of the insert involves lamination of two to four layers of fiber/titanium preforms placed between a top and bottom titanium sheet. The titanium sheet layers are of a minimum thickness sufficient to form the insert without damage to the silicon carbide monofilaments or the fiber matrix interface. The insert is preferably attached to a shelf within the main body member of the club head by welding, adhesive (epoxy) bonding, or brazing (e.g., vacuum brazing), but it may be secured by any means known in the art.

Specific enhancements observed for this fiber reinforced titanium composite insert include a 15 to 10 percent increase in club face stiffness, and a 20 to 30 percent weight savings in the hitting surface which can be redistributed to alter the center of inertial moment thereby increasing the desired hitting zone (i.e., a larger "sweet spot" can be achieved), relative to cast or forged metal strike face construction.

Also suitable for use herein are other metals and combinations of metals, and other high strength and/or high modulus fibers. Lighter metals, such as aluminum and its alloys, magnesium and its alloys and beryllium and its alloys, are preferred. Fibers of boron, carbon, graphite and various ceramics having a modulus of at least about 30 Mpsi are preferred. Fiber combinations may also be used.

In a preferred embodiment, the exterior surfaces of the insert are two plies of titanium sheets. These sheets are laminated to an inner construction of an aluminum sheet faced on each side with an aluminum/silicon carbide fiber composite preform This construction is consolidated to a monolithic composite in a vacuum hot press.

Other methods of composite fabrication, including molding of individual inserts, may be used, provided the fabrication method does not compromise fiber strength or composite integrity.

Thin foils of dissimilar (e.g., aluminum foil for titanium sheets and preforms) or similar metal may be employed in the lay-up of the preform to enhance bonding during consolidation of the composite.

A fiber orientation suitable for providing a maximum strike face strength and stiffness is preferred and may be selected by the practitioner. In a silicon carbide fiber reinforced metal for woods, an orientation of 90° from the long direction (toe to heel) of the strike face is most preferred. An orientation of 45° to 135° from the long direction of the strike face is also preferred.

In the fabrication of the composite the fiber is preferably located as close as possible to the strike face insert surfaces and as far away as possible from the center line (or neutral axis) of the club head (running in the long direction of the insert) as possible. This fiber positioning maximizes strike face stiffness (modulus) and optimizes golf club performance. Multiple plies of fiber preforms and metal may be used. For cost and weight reasons, two and four ply fiber preform/metal sheet are preferred, however, strength and stiffness generally improve as the number of laminated plies increase. In addition, a single ply of composite may be attached to the back face of the insert, providing that a low temperature bonding or brazing process is utilized in joining the fiber composite to the insert.

Example 1

A laminated composite of titanium metal and a silicon carbide fiber reinforced titanium was prepared by layering: (a) 0.035 inch thick titanium foil (Ti-6-4), (b) four plies of 0.010 inch thick tape preform of a single layer parallel array of silicon carbide fibers in a preform tape of titanium powder; and (c) 0.035 inch thick titanium (Ti-6-4).

The laminated preform was consolidated in a vacuum hot press to give a composite.

Strike face inserts were machined with an abrasive water-jet from the composite panel Grooves (0.02 inches, the maximum USGA striking face groove depth) were machined into the surface. Individual inserts were curved with a cold die and pressure to achieve the desired toe to heel and top to bottom curvature. A strike face insert, measuring about 2.5 inches in the long direction, and about 1.5 inches from top to bottom and 0.110 inches thick, was tested for surface deformation.

For testing, the insert was screw-mounted onto a contoured shelf which was machined into the face of a test fixture fabricated from mild steel The test fixture was made in the general shape of a golf club head for a wood (driver). The test fixture head was attached to a golf club shaft mounted in a holder positioned such that golf balls shot by an air cannon at the strike face insert would hit the insert at controlled speeds.

A depth guage was used to measure surface deformation at 6 fixed locations on the insert surface before and after testing with golf balls striking at a speed of 140 miles per hour.

A comparative test was run on the same insert having a thickness of only 0.105 inches. Results are shown in Table I below.

TABLE I

| Deformation Number of Gold Ball Strikes | Depth (inches) | | | | | | |
|---|---|---|---|---|---|---|---|
| | 0.110 Inch Insert | | | | 0.105 Inch Insert | | |
| | 0 | 50 | 100 | 150 | 0 | 25 | 50 |
| Location of Gauge Measurement: | | | | | | | |
| 1 (toe) | .148 | .148 | .149 | .150 | .320 | .320 | .300 |
| 2 (top) | .168 | .167 | .170 | .170 | .680 | .660 | .650 |
| 3 (heel) | .130 | .131 | .135 | .135 | .004 | .004 | .008 |
| 4 (bottom) | .172 | .171 | .175 | .174 | .670 | .660 | .660 |
| 5 (center) | .174 | .171 | .175 | .174 | .720 | .660 | .660 |
| 6 (center) | .173 | .170 | .173 | .173 | | | |

These results show the inserts are suitable for use in golf club heads. The resistance to deformation from golf ball strikes at 140 miles per hour was excellent for a 0.110 inch thick insert comprising a fiber reinforced metal composite.

Similar resistance to deformation performance was obtained with fiber reinforced inserts having thicknesses of 0.120 and 0.115 inches. This is an improvement over non-reinforced metal strike inserts of the art which must be used at a greater thickness and a higher weight to achieve the same performance.

Results also demonstrate that a thickness in excess of 0.105 inch is preferred for a titanium/silicon carbide fiber strike face insert mounted in a wood-type club.

Example 2

Strike face inserts were prepared as described in Example 1, except that various lay-ups were prepared, and the inserts were tested in iron clubs so that no curvature was made in the inserts.

The lay-ups prepared included: (a) 2 plies, each, of fiber reinforced titanium tape cast preform and of titanium foil (Ti-6-4) to yield a 0.120 inch thick insert; (b) the same as (a) except the insert was 0.110 inches thick; and (c) the same as (a) except the insert was 0.100 inches thick. The neutral axis of each insert was free of fiber reinforcement and comprised only titanium.

Each insert was tested in an iron club and performed as good as, or better than, monolithic iron clubs.

Example 3

A driver golf club was assembled from an insert (0.100 inch thick) fabricated as in Example 1. The insert was welded onto a 0.010 to 0.005 inch deep shelf in the face of the cast metal main body member of the driver head. The insert was fitted to the shape of the shelf to provide a continuous joint between the main body member of the driver and the strike face insert.

The assembly performed well in the air cannon apparatus when struck with golf balls shot at 140 miles per hour.

We clam:

1. A golf club head having a main body member and an insert secured to said main body member for engagement with the golf ball, wherein the insert comprises:

a) a metal layer forming the surface for engagement with the golf ball; and b) a layer of a fiber reinforced metal which is laminated to said metal layer.

2. A golf club head of claim 1, wherein the metal layer is constructed of a metal selected from the group consisting essentially of titanium and its alloys, aluminum and its alloys, magnesium and its alloys, and beryllium and its alloys.

3. A golf club head of claim 1, wherein the insert further comprises a third layer constructed of metal laminated to the fiber reinforced metal layer on the side opposite of the metal striking surface layer.

4. A golf club head of claim 1, wherein the fiber reinforced metal layer comprises at least one ply of fibers in parallel orientation with the metal matrix.

5. A golf club head of claim 4, wherein the fibers are selected from the group consisting of boron, carbon, graphite and ceramic fibers having a modulus of at least 30 Mpsi.

6. A golf club head of claim 4, wherein the metal matrix is constructed of a metal selected from the group consisting essentially of titanium and its alloys, aluminum and its alloys, magnesium and its alloys, and beryllium and its alloys.

7. A golf club head of claim 4, wherein the parallel fibers extend transverse to the length of the golf club head.

8. A golf club head of claim 7, wherein the fiber ply is displaced from the neutral axis of the insert.

9. A golf club head of claim 1 further comprising a means for securing the insert to the main body member.

10. A golf club head having a main body member with a forward facing surface and an insert secured to said forward surface for engagement with the golf ball wherein the insert consists of a laminated composite sandwich comprising:
   (a) a pair of outer layers, constructed of metal, one forming the surface for engagement with the golf ball and the other forming the interface with said forward surface;
   (b) a pair of inner layers constructed of a fiber reinforced metal composite laminated between and adjacent to said outer layers; and
   (c) a central core layer, constructed of metal, laminated between the inner fiber reinforced metal composite layers.

11. A golf club head having a main body member with a forward facing surface and an insert secured to said forward surface for engagement with the golf ball wherein the insert consists of a laminated composite sandwich as described in claim 10 in which the core layer is constructed to displace the inner layers away from the neutral axis of the insert.

12. A golf club head having a main body member with a forward facing surface and an insert secured to said forward surface for engagement with the golf ball wherein the insert consists of a laminated composite sandwich as described in claim 10 in which the outer layers are constructed of Titanium or Titanium alloy, the inner layers consist of silicon carbide fibers within an Aluminum or Aluminum alloy matrix, and the core layer is constructed of Aluminum or Aluminum alloy.

* * * * *